US010068361B2

(12) United States Patent
Kim et al.

(10) Patent No.: US 10,068,361 B2
(45) Date of Patent: Sep. 4, 2018

(54) HYBRID LEVEL SET FOR INTERACTIVE EDITING OF MATTING AND SELECTION

(71) Applicant: ADOBE SYSTEMS INCORPORATED, San Jose, CA (US)

(72) Inventors: Byungmoon Kim, Sunnyvale, CA (US); Gagan Singhal, Sri Nagar (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/685,585

(22) Filed: Aug. 24, 2017

(65) Prior Publication Data
US 2017/0372503 A1 Dec. 28, 2017

Related U.S. Application Data

(63) Continuation of application No. 14/947,763, filed on Nov. 20, 2015, now Pat. No. 9,786,078.

(51) Int. Cl.
*G06T 11/60* (2006.01)
*G06T 7/13* (2017.01)

(52) U.S. Cl.
CPC .............. *G06T 11/60* (2013.01); *G06T 7/13* (2017.01)

(58) Field of Classification Search
CPC .............. G06F 3/04842; G06F 3/0482; G06F 3/04845; G06F 3/04883; G06F 3/04847; G06T 11/60; G06T 2207/10024
See application file for complete search history.

(56) References Cited

U.S. PATENT DOCUMENTS

| 8,391,594 B1* | 3/2013 | Wang | G06T 7/194 |
| | | | 382/100 |
| 2005/0185045 A1* | 8/2005 | Kamariotis | H04N 19/503 |
| | | | 348/14.12 |

(Continued)

OTHER PUBLICATIONS

First Action Interview Office Action dated Jan. 30, 2017 in U.S. Appl. No. 14/947,763, 3 pages.

(Continued)

*Primary Examiner* — Zhengxi Liu
*Assistant Examiner* — Raffi Isanians
(74) *Attorney, Agent, or Firm* — Shook, Hardy & Bacon L.L.P.

(57) ABSTRACT

In various implementations, methods and systems are disclosed for accurately selecting a targeted portion of a digital image. In one embodiment, a selection cursor having a central and a peripheral region is provided. The central region is used to force a selection or a deselection and therefore moving the central region over a portion of the image causes that portion of the image to be selected or deselected, respectively. The peripheral region of the cursor surrounds the central region and defines an area where a hybrid level set algorithm for both boundary detection and region definition, particularly a matting region, is performed. This provides highly accurate boundary detection and matting region selection within a narrowly-focused peripheral region and eliminates the need to subsequently designate a matting region and apply a matting algorithm to complex portions of an object selection. Thus moving the peripheral region of the selection cursor over a boundary of the targeted portion of the image applies the hybrid algorithm in that boundary region, increasing the likelihood that the boundary will be detected accurately, and further defining at least a matting region along the detected boundary for an even more refined selection.

17 Claims, 8 Drawing Sheets

(56) References Cited

U.S. PATENT DOCUMENTS

2014/0219580 A1* 8/2014 Tseng .................. G06F 3/048
382/282
2014/0258941 A1* 9/2014 Lim .................. G06F 3/04812
715/862

OTHER PUBLICATIONS

Notice of Allowance dated Jun. 28, 2017 in U.S. Appl. No. 14/947,763, 17 pages.
Zheng, W., Yong, J. H., & Paul, J. C. (2009). Simulation of bubbles. Graphical Models, 71(6), 229-239.
Kim, B. (Dec. 2010). Multi-phase fluid simulations using regional level sets. In ACM Transactions on Graphics (TOG) (vol. 29, No. 6, p. 175). ACM.

* cited by examiner

HYBRID LEVEL SET FOR INTERACTIVE EDITING OF MATTING AND SELECTION

CROSS-REFERENCE TO RELATED APPLICATIONS

This application is a continuation of and claims priority from U.S. application Ser. No. 14/947,763, filed Nov. 20, 2015, which is assigned or under obligation of assignment to the same entity as this application, the entire contents of the application being herein incorporated by reference.

BACKGROUND

Many image editing software applications are available for adjusting, modifying, and otherwise manipulating digital images. These software applications generally allow a user to make global manipulations to an entire image, as well as make localized manipulations affecting only a selected portion of an image. Sometimes, a user may want to extract portions of an image and apply the extracted portions to a new background or other design. When extracting portions of an image, a user must first select the portion of the image to be extracted, then copy and/or extract the portion for association with another image. Sometimes, selection of a complex object within an image in preparation for extraction can be quite difficult. A simplified tool for both selecting and accurately refining the selection of a complex object would be very beneficial.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments described herein are directed to defining a matting region while editing a selection mask associated with a source image. In essence, embodiments are directed to employing a boundary-detecting algorithm to facilitate the identification of a matting region in real time as a user modifies a hard selection. In this way, as a user is refining a selection and approaches a complex portion of a selected object, a region-defining algorithm can define the complex portion as a matting region, such that a matting algorithm can be selectively applied thereon to obtain a refined selection edge over the complex portion.

At a high level, a selection cursor is overlaid on a displayed source image. A selection mask boundary is adjusted by applying a boundary-detecting feature of a hybrid algorithm thereon. In accordance with adjusting the selection mask boundary utilizing boundary-detecting feature of the hybrid algorithm, a matting region is simultaneously defined along the selection mask boundary as it is being adjusted by applying a region-defining feature of the hybrid algorithm thereon. A matting algorithm can then be applied to the matting region defined along the adjusted selection mask boundary to refine the selection edge.

BRIEF DESCRIPTION OF THE DRAWINGS

The present invention is described in detail below with reference to the attached drawing figures, wherein.

DETAILED DESCRIPTION

Figure 1:
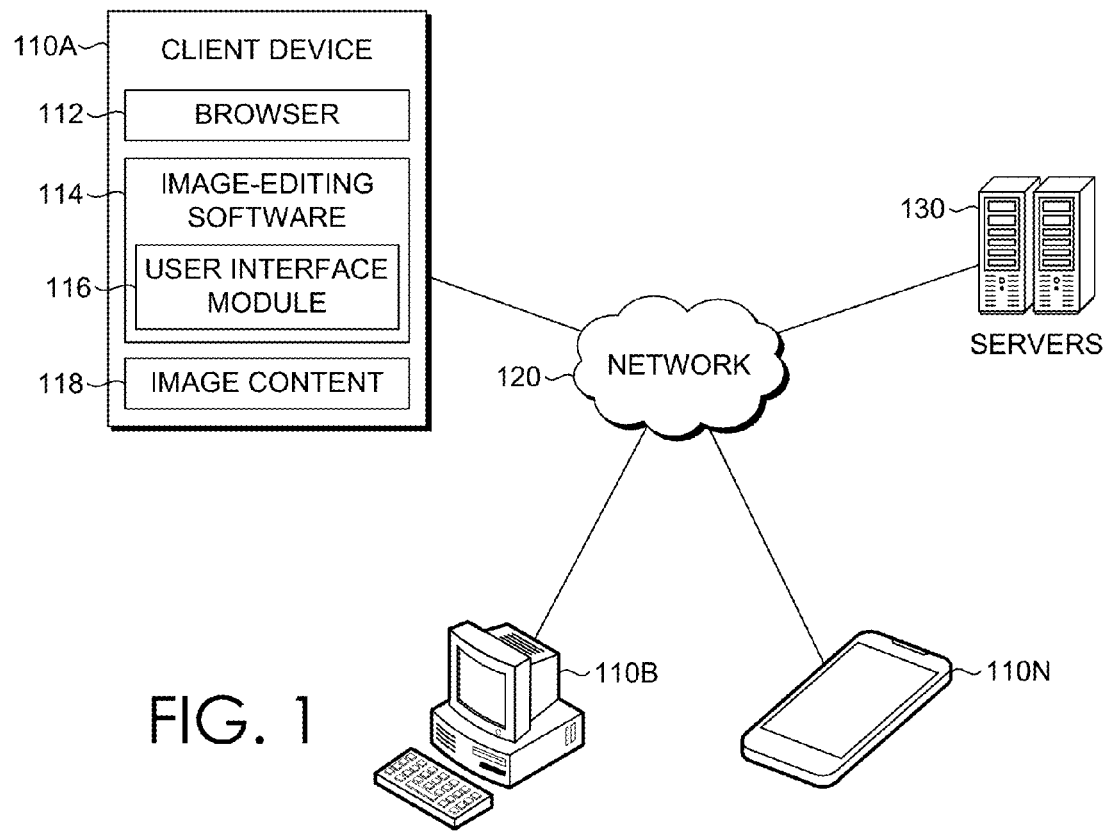
FIG. 1 is a diagram illustrating an exemplary system, in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments described herein are directed to providing a selection mask refinement feature operable to refine hard selections while automatically defining matting regions along detected object boundaries. More particularly, embodiments described herein are directed to a selection mask refinement feature that can adjust a hard selection mask using an edge-detecting algorithm, while simultaneously defining a matting region driven by the confines of the edge-detecting algorithm. Once a matting region is defined, a matting algorithm can then be selectively applied to the defined matting region to cooperatively make a refined and accurate selection mask around detected complex edges. In other words, embodiments can define a matting region or "soft selection" on detected complex edges while editing a hard selection mask associated with a source image. In this way, selection masks can be modified and accurately refined in a single step with a unitary selection tool.

As was described briefly above, image editing software applications are often used to adjust, modify, and otherwise manipulate digital images. One example of such an application is Adobe® Photoshop®, developed by Adobe Systems Incorporated. Software such as this allows users to make localized adjustments to a selected portion of an image, copy selected portions of an image, or extract selected portions of an image. These operations can be useful, for example, if a user wishes to extract a foreground object from one image, and place the object onto a new background or design. Whenever an object is selected, however, such localized operations first require the creation of a "selection mask" which defines the portion of the image that is to be adjusted, copied, or extracted. After the selection is defined, the desired operation can then be applied to the portion of the image within the selection mask.

Conventional selection tools may incorporate algorithms that assist in detecting edges or "boundaries" of a foreground object distinguishable from its background. In this way, objects having more definite or clearly-defined edges can easily be selected by a user employing a conventional selection tool. These conventional selection tools make what is known in the art as "hard selections." Hard selections are typically made using a level set algorithm, which defines whether a selected portion of an image is clearly inside the selection, outside the selection, or along the selection boundary. In some instances, however, image backgrounds may be muddied, and unexpected colors or shadows may cover portions of the foreground object, which may cause the selection tool to select undesirable edges. Because edge-detecting algorithms are far from perfect, some image editing software applications have developed selection edge-adjustment features that can modify a hard selection edge by pushing and snapping portions of the hard selection to various edges as they are detected, based on inputs by a user.

In some other instances, the object being selected can be too detailed for the conventional selection tool. That is, the object may include edges that are too complex for edge-detecting algorithms to make accurate and detailed selections. For example, portions of a lion's mane (i.e., wispy hairs) could be too complex for the conventional selection tool. More particularly, complex portions such as hair, eye lashes, feathers, grass, leaves, and other objects having fibrous or feathered characteristics can provide difficult for edge-detecting algorithms in conventional selection tools to accurately distinguish from their background. As conventional selection tools typically employ a level set algorithm for boundary detection, a portion of an image that may appear blurry or indefinite (i.e., the hairs standing out of the lion's mane) must either be determined as being part of a selection or not. Although conventional selection tools and selection-edge adjustment features are unable to make accurate and detailed selections of complex boundaries or edges, the edge-detecting features therein can still make a fairly decent determination of the object's boundary line.

Separate tools having specialized algorithms are traditionally employed by users to specify complex regions of a source image, for analysis and refinement of the initially-defined hard selection. When image objects have edges that are too complex for the conventional selection tool, some image editing software applications provide what are called "soft selection" tools that allow a user to make or refine intricate selections to the complex edges. Although not described in detail herein, disclosure for such soft selection tools is incorporated herein with particular reference to U.S. Pat. No. 8,406,566, entitled METHODS AND APPARATUS FOR SOFT EDGE MASKING. A major setback of such soft selection tools is that it requires that the user manually specify where the complex edges of the object are. In this regard, it would be highly desirable to incorporate into a selection tool and/or a selection-edge adjustment feature, an additional soft selection feature that can utilize the edge-detecting features of conventional selection tools to automatically specify a region around the complex edges (also referenced herein as a "matting region") utilized for making the soft selection.

Turning now to FIG. 1, a diagram is provided illustrating an exemplary system in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can be a client only or a client-server system that can be utilized to make adjustments to selection masks associated with a source image. Among other components not shown, the system 100 can include any number of client devices, such as client devices 110*a* and 110*b* through 110*n*, network 120, and one or more remote server devices 130. It should be understood that any number of servers and client devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers and client devices shown in FIG. 1 may be implemented via a computing device, such as computing device 1100, later described with reference to FIG. 11, for example. The components may communicate with each other via network 120.

Network 120 may be wired, wireless, or both. Network 120 may include multiple networks, or a network of networks, but is shown in simple form so as not to obscure aspects of the present disclosure. By way of example, network 120 can include one or more wide area networks (WANs), one or more local area networks (LANs), one or more public networks, such as the Internet, and/or one or more private networks. Where network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 120 is not described in significant detail.

In various implementations, client devices 110*a* and 110*b* through 110*n* are computing devices that are capable of accessing the Internet, such as the World Wide Web. Client devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Client devices 110a and 110b through 110n can include one or more processors, and one or more computer-readable media. The computer-readable media may include computer-readable instructions executable by the one or more processors. The instructions may correspond to one or more applications, such as browser 112, image editing software 114 and/or user interface module 116, shown on client device 110a.

Browser 112, such as a web browser, can be an HTTP-compatible application (e.g. an Application that supports an HTTP protocol). A specific example of browser 112 is a Google® Chrome® web browser. Image editing software 114 may be independently installed on the client device as a standalone application, or can be accessed through a web-based application hosted by server 130 or other server (s) (not shown) and accessible to client devices by the browser 112. In some instances, the image editing application 114 can be accessible over the web (e.g., a dynamic web application or a cloud-based web application) through the browser 112. Accessing the dynamic web application 114 over the web can be accomplished on the client 110a by visiting a Uniform Resource Identifier (URI or URL) to receive code (e.g., HTML) for rendering, the code being dynamically generated by the server 130 and communicated to the client 110a over the network 120.

The image editing application 114 can be configured to, among other things, manipulate source images by at least making selections to objects and/or backgrounds using one or more selection editing tools. One example of such an application is Adobe® Photoshop®, developed by Adobe Systems Incorporated. In some embodiments, the image editing application can include a user interface module for facilitating the selection and manipulation of objects or backgrounds in source images, as will be described in more detail with regards to user interface module 116.

The user interface module 116 can be configured to provide information to, and to receive information and commands from, a user; it can be implemented with or otherwise used in conjunction with a variety of suitable input/output devices such as a display, a touchscreen, a speaker, a keyboard, a mouse and/or a microphone.

The image editing application 114 can also be configured to read and/or manipulate image content 118, which can comprise one or more source images. In various configurations, the image content 118 can be read, manipulated, and saved in memory as a new and/or separate asset.

The server 130 can include one or more server computing device(s) configured in a network environment, or can include a single computing device hosting, in some embodiments, an application service for the image-editing software 114. Each server computing device can include one or more processors, and one or more computer-readable media. The computer-readable media may include computer-readable instructions executable by the one or more processors. The instructions may correspond to one or more applications, such as image editing software 114 or user interface module 116, shown on server device 130. The server 130 can be configured to store, among other things, computer-readable instructions for hosting the image-editing software 114, image content 116, and more, in a memory (not shown). The memory can be comprised of one or more computer-readable media, or may comprise one or more database(s) (not shown) for storing data, as can be appreciated by one of ordinary skill in the art.

The server 130 can comprise a web server, such as Apache®, ITS®, nginx®, or GWS®, among many others, and can be configured to communicate over the network 120 to provide application services for manipulating source images to users on a client device via browser 112 or image editing software application 114. While the standard network protocol for communication is HTTP, it is contemplated that any network protocol can be used to distribute information between the server 130 and the image editing application 114 of client device 110a. In more detail, if the image editing application 114 is communicated to the client device 110a over the World Wide Web and accessed via browser 112, the server 130 can be configured to provide dynamic code, or the like, to users for navigating a workflow directed to manipulating source images. If the image editing application 114 is a standalone application installed on the client device 110a, in some embodiments, the server 130 can be configured to provide cloud services for viewing, manipulation, and storage of image content 116 by the image editing application 114.

Figure 2:
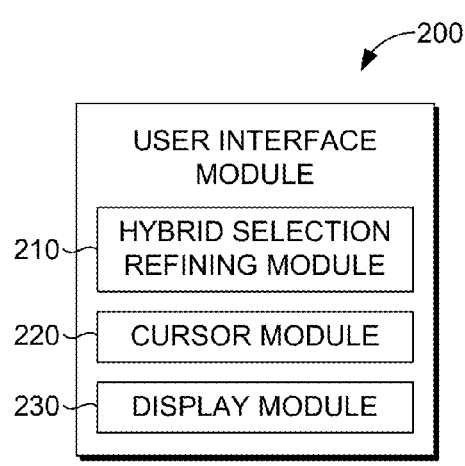
FIG. 2 is a diagram illustrating an exemplary component of the system of FIG. 3, more particularly, the user interface module, in accordance with implementations of the present disclosure.

Moving now to FIG. 2, the user interface module 200 can be configured with the various selection editing techniques provided herein, so as to facilitate the process of selecting a targeted and refined portion of a digital image using an image editing software application, in accordance with an embodiment of the present invention. This functionality can be implemented using, for example, sub-modules including a hybrid selection refining module 210, a cursor module 220, and a display module 230. Other modules may additionally or alternatively be included, in other embodiments. As will be appreciated, the image editing application may be local to the client device 110a of FIG. 1, or served to the client device 110a by an application server 130. In other embodiments, the selection editing techniques may be implemented in one or more dedicated modules with which the user interface module 200 interacts. These various selection editing techniques and sub-modules will be discussed in greater detail with reference to the example embodiments depicted in FIGS. 6A-6C.

As was described, embodiments described herein employ a hybrid algorithm that includes aspects from both a conventional level set algorithm for making or editing the hard selection mask, in addition to a tri-regional level set algorithm for defining a matting region to apply the matting algorithm thereon. Although not described herein, disclosure for conventional level set algorithms for making and refining hard selection masks is incorporated herein with particular reference to U.S. Non-Provisional patent application Ser. No. 13/789,975, entitled SELECTION EDITING USING A LOCALIZED LEVEL SET ALGORITHM (hereinafter referenced as "the Prior Art").

Figure 3:
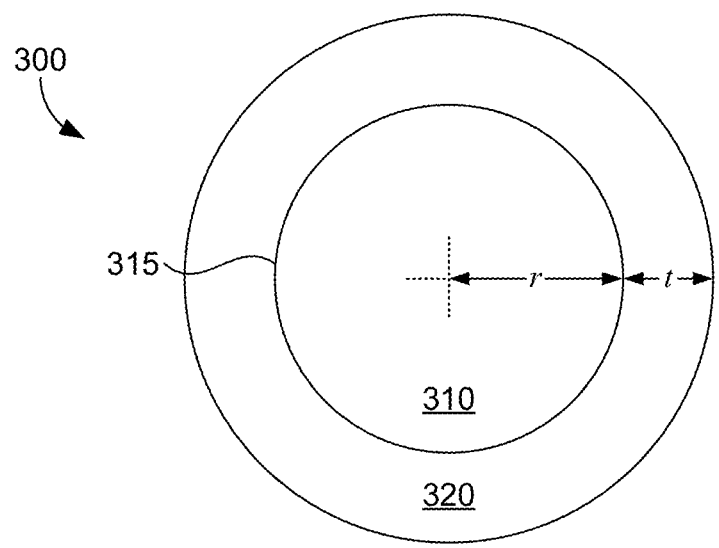
FIG. 3 is a schematic illustration of a selection cursor configured in accordance with both the prior art and an embodiment of the present disclosure.

With reference to FIG. 3, in one embodiment, a selection tool, such as selection cursor 300 of FIG. 3, can include a hybrid level set algorithm that employs aspects from both the conventional level set and the regional level set to operate as a hybrid selection refining module, as will be described with reference to FIGS. 5-7. The example selection cursor 300 includes an interior region 310 having a radius r, and a peripheral region 320 having a thickness t that generally surrounds the interior region 310. The interior region 310 and peripheral region 320 meet at an interface 315. The interior region 310 is also referred to herein as the central region 310, even though the interior region 310 does not need to be positioned in the center of the selection cursor 300. While the example selection cursor 300 has a circular configuration, it is contemplated that such a configuration is not limiting and selection cursors having other shapes and/or sizes can be employed within the scope of the prior art and embodiments described herein. In some embodiments, the relative dimensions of the radius r and the central region 310 and the thickness t of the peripheral region 320 of the selection cursor 300 are user-configurable. Thus, for instance, if a user wanted to use a selection cursor having a relatively larger central region and relatively smaller peripheral region, or vice-versa, the selection cursor could be configured according to such preference. However, in other embodiments, the shape and dimensions of the selection cursor are not configurable, and are otherwise predetermined by default.

In some embodiments, the central region 310 of the selection cursor 300 is used to define a region of the source image that is to be included, within the selection region, in such embodiments, moving the central region 310 over a portion of the source image causes that portion of the source image to be included within the selection region. In this case, the selection cursor 300 is referred to as having a positive polarity, or as being a "selecting", "growing" or "sourcing" selection cursor. However, in other embodiments the central region 310 of the selection cursor 300 is used to define a region of the source image that is to be excluded from the selection region. In such embodiments, moving the central region 310 over a portion of the source image causes that portion of the source image to be excluded from the selection region. In this case, the selection cursor 300 is referred to as having a negative polarity, or as being a "deselecting", "shrinking" or "sinking" selection cursor. The polarity of the selection cursor 300 can be controlled, for example, via a configuration setting accessed using a control menu, a configuration setting accessed using a control panel, or through the use of an alternate selection control such as an alternate mouse button. In certain embodiments the polarity of the selection cursor 300 can be indicated to the user by a different appearance of the selection cursor, such as a different color or texture scheme. For more detail on the selection cursor 300, disclosure for such is provided with particular reference to the Prior Art.

Figure 4:
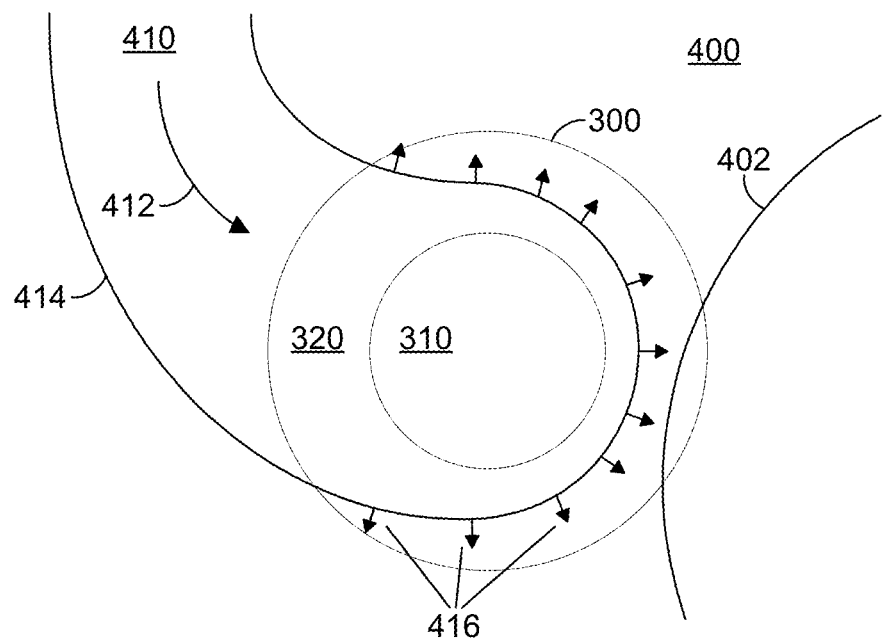
FIG. 4 schematically illustrates an example methodology of defining a selection region using a selection cursor, as is described in the prior art.

By way of background, with brief reference to FIG. 4, a conventional selection tool as described in the Prior Art demonstrates a selection cursor 300 used to define a new selection region or to expand an existing selection region. In this example, the selection cursor 300 has a positive polarity. The source image 400 includes a boundary 402 that is to be detected. The selection region 410 is optionally indicated by a boundary line 414, which can be displayed to the user in real-time, or nearly in real-time, as the user moves the selection cursor 300 over the source image 400, in some embodiments. As explained previously, portions of the source image 400 over which the cursor central region 310 passes are included within the selection region 410. A level set algorithm is applied within the cursor peripheral region 320, thereby allowing boundary 402 to be detected. In general, the selection region 410 expands outward from the cursor central region 310 toward the outer edge of the cursor peripheral region 320, as indicated by arrows 416 in FIG. 4. The arrows 416 correspond to a velocity vector associated with the rate of expansion of the selection region 410. However, where a boundary is detected within the peripheral region 320, such as boundary 402, the expansion of selection region 410 is modified such that selection region 410 substantially conforms to, and is constrained by, the detected boundary 402.

Figure 5:
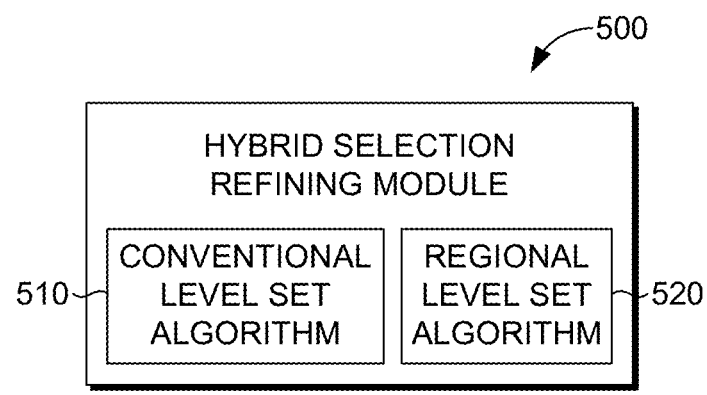
FIG. 5 is a diagram illustrating an exemplary subcomponent of the system of FIG. 1 and FIG. 2, more particularly, the hybrid selection refining module, in accordance with implementations of the present disclosure.

With brief reference now to FIG. 5, embodiments described herein are directed to a hybrid selection refining module 500, which includes at least a conventional level set algorithm 510 and a regional level set algorithm 520. On a high level, the conventional level set algorithm 510 can be employed to essentially "drive" the matting region-defining portion of the regional level set algorithm 520. As was described in reference to FIG. 4, the conventional level set algorithm was applied within the cursor peripheral region 320, which allowed boundary 402 to be detected. The conventional level set algorithm, when applied within the cursor peripheral region 320, would expand the selection region 410 and modify the selection region 410 such that selection region 410 substantially conforms to, and is constrained by, the detected boundary 402. Complex portions such as hair, eye lashes, feathers, grass, leaves, and other objects having fibrous or feathered characteristics can be detected, albeit very roughly, by edge-detecting algorithms. At a minimum, the edge-detecting algorithms of conventional selection tools can determine that some portion of the complex portion may or may not be inside of the selection.

Now, with regards to the hybrid selection refining module 500 in FIG. 5, the conventional level set algorithm 510 can also be applied within the cursor peripheral region, but instead of driving the expansion of the selection region 410, the conventional level set algorithm 510 is employed by hybrid selection refining module 500 to expand and detect boundaries for placement of a matting region. More particularly, although the edge-detecting aspects of the conventional level set algorithm 510 can oftentimes make a very rough determination of a complex boundary (such as boundary 602 in FIG. 6B), it can at least roughly define a matting region, which is generally defined between the inside of a selection and the outside of the selection.

By way of background, regional level set algorithms, such as regional level set algorithm 520, are generally configured to define regions of images and shapes relative to one another. Tri-regional level set algorithms, in particular, can define whether a portion of an image is clearly within a first region (i.e., inside a selection), clearly within a second region (i.e., outside the selection), or within a third region (i.e., part of a matting region positioned somewhere in between the first and second regions). In essence, a tri-regional level set can define three definite regions of an image, in accordance with embodiments described herein. In contrast to the level set algorithm, which defines merely whether a region is defined inside or outside of a selection region, the tri-regional level set algorithm is configured to define three distinct regions—inside a selection, outside a selection, and a matting region. In embodiments described herein, the regional level set algorithm 520 essentially "piggy-backs" the edge-detecting features of the conventional level set algorithm 510 to define a matting region, as will be described with reference to FIGS. 6A-6C.

Figure 6A:
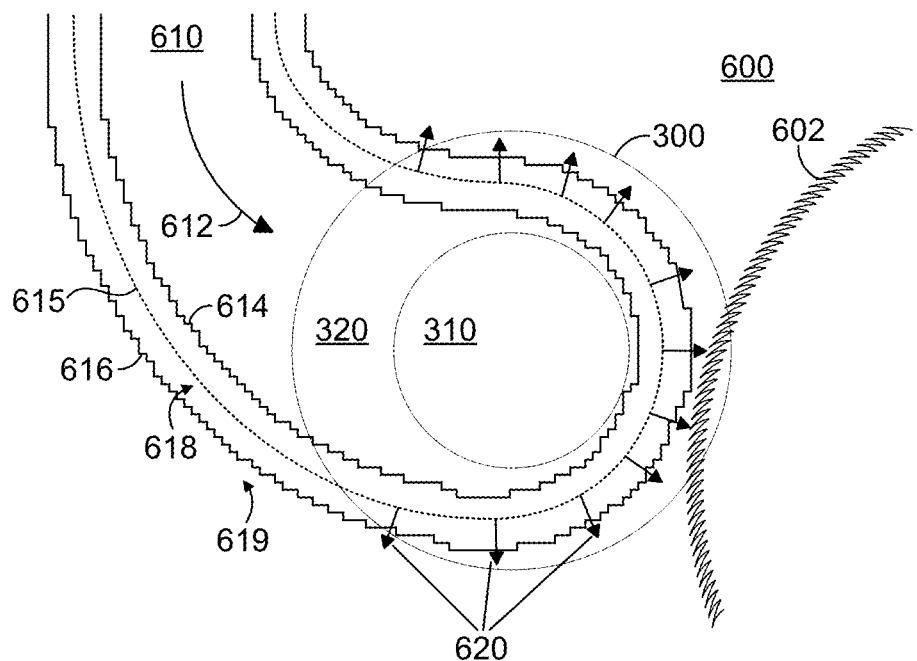
FIGS. 6A-6C schematically illustrate an example methodology of defining a selection region and matting region using a selection cursor, in accordance with implementations of the present disclosure.
Figure 6B:
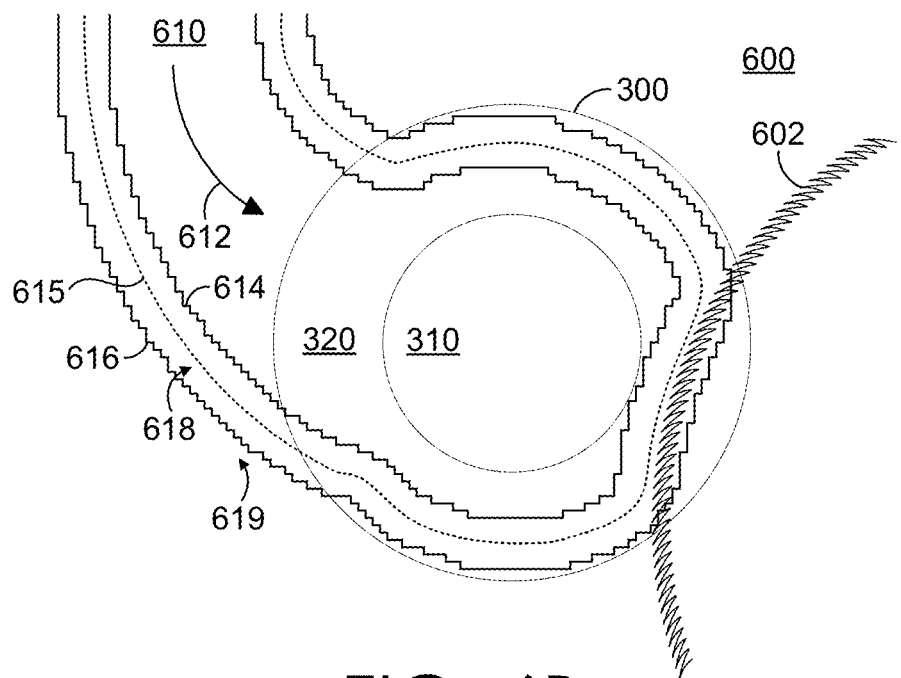
Figure 6C:
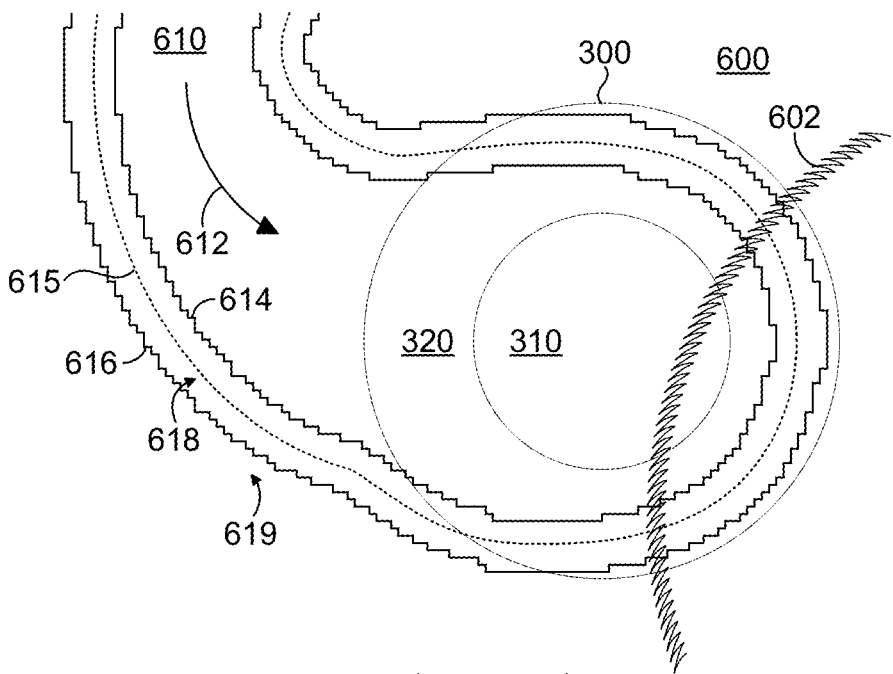

Looking now to FIGS. 6A-6C, FIGS. 6A-6C illustrate an example methodology for defining a refined selection region employing the hybrid selection refining module. FIGS. 6A-6C illustrate an example methodology for defining an selection region 610 and a matting region 618 using a selection cursor 100 that is passed over a source image 600 in a direction indicated by arrow 612, in accordance with an embodiment of the present invention. This technique can be used to define a new selection region 610 or to expand an existing selection region 610, while also defining a matting region 618 for refinement of the selection region 610. In this example, the selection cursor 100 has a positive polarity. The source image 600 includes a boundary 602 that is to be detected. The selection region 610 is optionally indicated by a selection boundary line 614 and a matting region 618 is optionally indicated by a matting region boundary line 616, which can each be displayed to the user in real-time, or nearly in real-time, as the user moves the selection cursor 100 over the source image 600, in some embodiments.

Similar to the conventional selection tool, portions of the source image 600 over which the cursor central region 110 passes are included within the selection region 610. A hybrid algorithm is applied within the cursor peripheral region 120. The conventional level set portion of the hybrid algorithm (for instance, conventional level set algorithm 510 of FIG. 5) is applied within the cursor peripheral region 120, which expands as the sub-region of the source image is analyzed, thereby allowing boundary 602 to be detected. The boundary-detection aspects of the conventional level set portion of the hybrid algorithm are particularly demonstrated by dotted line 615. At the same time, the regional level set algorithm (for instance, regional level set algorithm 520 of FIG. 5) is also applied within the cursor peripheral region 620, thereby allowing at least the defining of a matting region 618.

In more detail, the regional level set algorithm defines the first region (inside the selection) 610, the second region (outside the selection) 619, and the third region (the matting region) 618. In some embodiments, the matting region 618 is characterized as surrounding a region outside and inside the boundary-detecting aspects of the conventional level set portion of the hybrid algorithm, demonstrated by dotted line 615. In this way, the matting region is characterized as a thick line that corresponds to the boundary-detection aspects of the conventional level set portion of the hybrid algorithm.

In general, the selection region 610 follows the expanding dotted line 615 driven by the conventional level set portion of the hybrid algorithm, while the matting region 618 is pushed outwardly by the dotted line 615, while both regions 610, 618 expand outward from the cursor central region 110 toward the outer edge of the cursor peripheral region 120, as indicated by arrows 620 in FIG. 6A. The arrows 616 correspond to the velocity vector $$\vec{v}$$

of Equation (3), above. However, where a boundary is detected within the peripheral region 120, such as boundary 602, the expansion of selection region 610 is modified such that selection region 610 is constrained by the detected boundary 602. In more detail, the expansion of the selection region 610 is restricted from extending past the detected boundary 602, while the expansion of matting region 618 extends past the detected boundary 602, but is similarly modified such that matting region 618 is constrained from extending too far beyond the detected boundary 602. Such modification is illustrated in FIG. 6B, which shows that the selection region 610 has expanded toward the outer edge of the cursor peripheral region 120, except where such expansion is constrained by boundary 602. Likewise, the matting region 618 has also expanded toward the outer edge of the cursor peripheral region 120, and extends past the boundary 602, but is constrained from extending beyond the outer edge of the cursor peripheral region 120. In embodiments, a matting algorithm can be selectively applied to the defined matting region 618, so as to refine the selection region 610 with a soft selection in addition thereon. Selective application of the matting algorithm can be facilitated by a user input, such as a mouse click, the release of a mouse input, or any other user interaction with an input device.

If the user wishes to expand the selection region 610 across the detected boundary 602, the user can simply move the cursor central region 110 across boundary 602. Because portions of the source image 600 over which the cursor central region 110 passes are included within the selection region 610 regardless of any boundaries detected in the source image 600, this will effectively expand the selection region 610 and the matting region 618 across the detected boundary 602, as is illustrated in FIG. 6C. In this example case, the hybrid algorithm continues to be applied within the cursor peripheral region 120 such that other boundaries that may exist beyond boundary 602 are detected and matting regions are further defined.

Referencing back now to FIG. 5, hybrid selection refining module 500 includes the conventional level set 510 ("Φ") and the regional level set 520 ("(r, Ψ)"). To this end, the grow and/or shrink velocity can be computed from a gradient of Φ. Utilizing Φ further facilitates the ability to retain the hard selection boundary, as is typical of the conventional level set algorithm. Further, edge snapping, as described above and in Prior Art with regards to the applications of the conventional level set algorithm, is applied for Φ only. As such, Φ and (r, Ψ) are updated by slightly varying velocities. This, however, causes a compatibility issue as Φ<0 is indicative that the position is located inside the selection, and when Φ<0, r cannot equal 1. Similarly, when Φ>0, r cannot equal 0. To solve this discrepancy, after updating Φ and (r, Ψ), compatibility is enforced by setting the following:

if Φ<0 and r=1, set r=0 and Ψ=0 if Φ>0 and r=0, set r=1 and Ψ=0.

To this end, in the following re-distancing step, Ψ will grow slightly by negotiating with neighbors so that the gradient of Ψ is close to 1.

In some embodiments, the matting region can be thickened by employing the following:

if r=2, then Ψ=Ψ+S if r=0 or 1, then Ψ=Ψ−S if Ψ<0, then Ψ=−Ψ and r=2 where S is the speed of growth.

While a tri-regional level set algorithm, without being conjoined with a level set algorithm, may be considered for use in selection tools, such as selection cursor 300 of FIG. 3, for defining the various regions (i.e., inside, outside, and matting regions), the tri-regional level set algorithm alone may encounter problems in facilitating the grow and shrink operations of the selection cursor, as described in reference to FIG. 4. More particularly, where the conventional level set described above is represented by the signed distance function Φ, the regional level set is represented by (r, Ψ), where r is an integer and Ψ is an unsigned (non-negative) distance to the trimap boundary (i.e., the selection boundary). The function r can be characterized as either r=0 (inside the selection), r=1 (outside the selection), or r=2 (part of the matting region). When computing a distance field's gradient using regional level sets, −Ψ of the neighbor is employed if the neighbor has a different r value. Problematically, however, using regional level set algebra, the velocity vector does not compute as required for grow and shrink operations. This is because the velocity vector is computed from the gradient of $\Psi$, and the gradient of $\Psi$ depends on a regional algebra design—such as changing the sign of $\Psi$ based on regional differences. Unfortunately, there is no regional algebra that computes high quality gradients that can be used for growing or shrinking operations. Use of regional level sets in the context of structural region definitions is further discussed in "Multi-Phase Fluid Simulations Using Regional Level Sets", by Byungmoon Kim (2010), and also in "Simulation of bubbles", by Wen Zheng et al. (2009).

Figure 7:
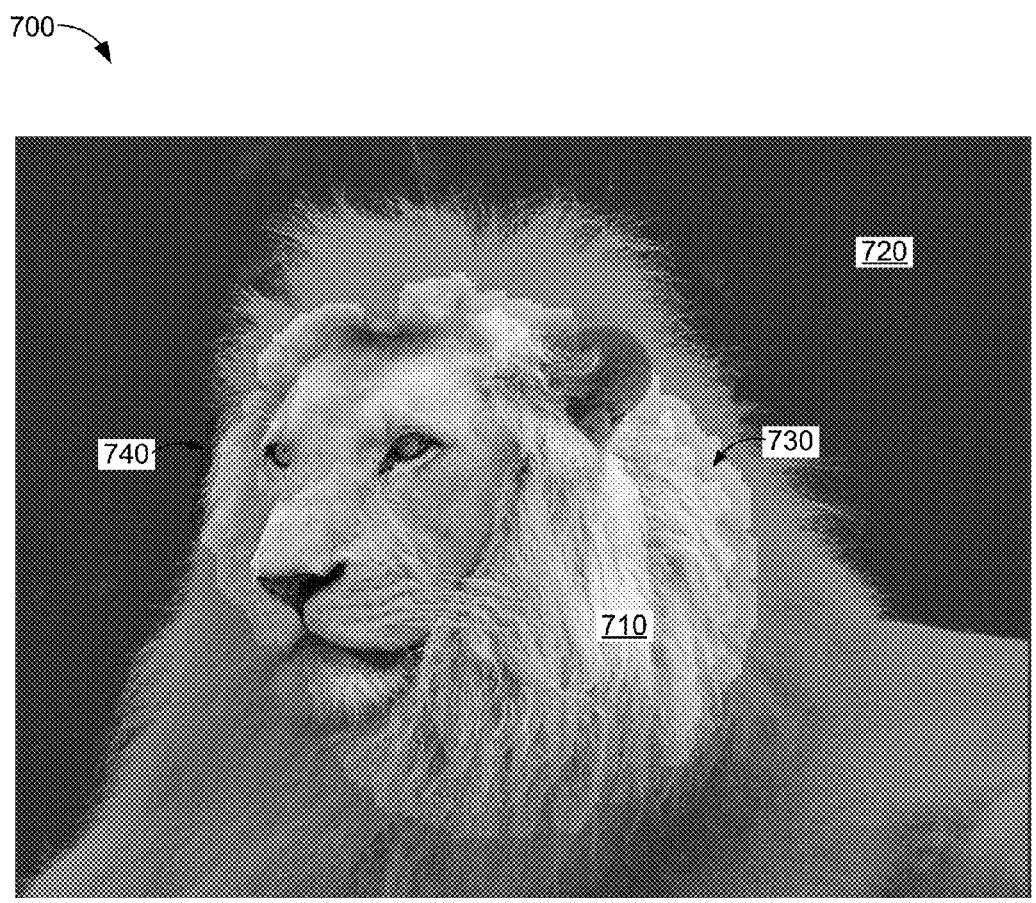
FIG. 7 illustrates an example source image selection mask having a defined selection region and matting region using a selection cursor, in accordance with implementations of the present disclosure.

Looking now at FIG. 7, a source image 700 portraying a lion is provided, so as to illustrate how the unselected region 720, the selected region 710, and the matting region 730 are each displayed and distinguished in an exemplary pass of the hybrid selection refining module (for instance, employing user interface module 400 of FIG. 4). In the illustrated embodiment, the selected region 710 shows a first portion of the underlying source image, the unselected region 720 shows a darker translucent mask over a second portion of the underlying source image, whereas the masking region 730 shows a lighter translucent mask over a third portion of the underlying source image. As described, upon making a selection with the hybrid selection refining module in accordance with embodiments described herein, the selected region 710 is established as part of the user's selection, the unselected region 720 is established as outside of the user's selection, while the matting region 730 is in a region between the selected region 710 and unselected region 720. The matting region 730 can then be selectively processed by a matting algorithm so that a sub-region of the underlying source image corresponding to the matting region 730 is analyzed and a soft selection is made thereon for refinement of the selected region 710. Application of the matting algorithm can refine the selected region 710 so that complex portions of the image, such as portion 740, is accurately selected and appended to selected region 710.

Figure 8:
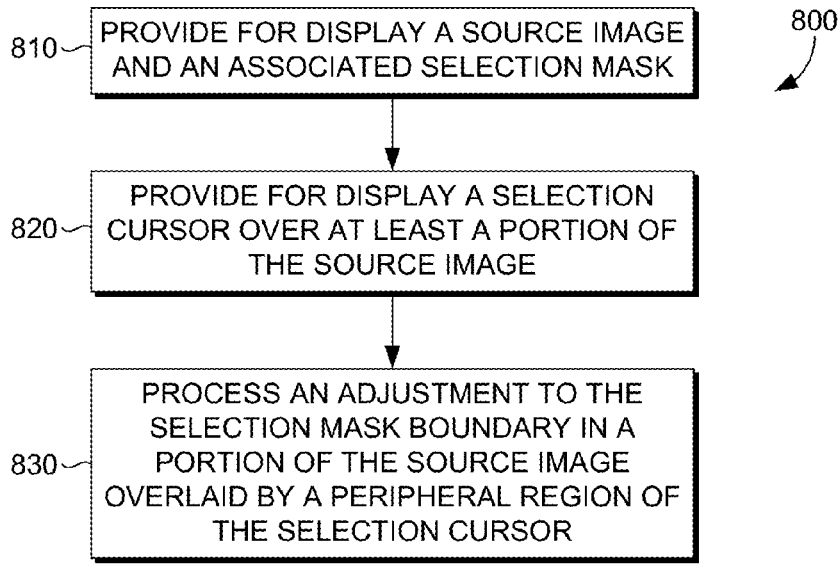
FIG. 8 is a flow diagram showing a method for adjusting a selection mask associated with a source image, in accordance with implementations of the present disclosure.
Figure 9:
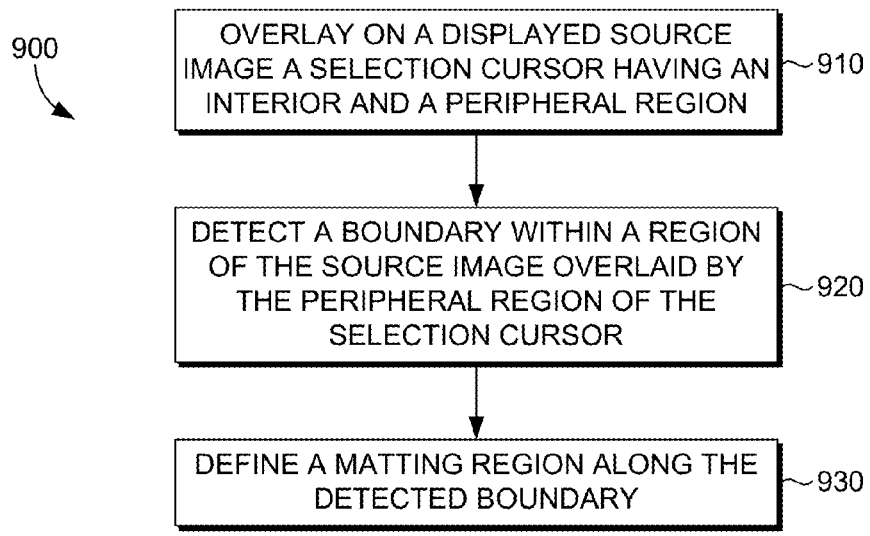
FIG. 9 is a flow diagram showing a method for adjusting a selection mask associated with a source image, in accordance with implementations of the present disclosure.

Having described various aspects of the present disclosure exemplary methods are described below for adjusting a selection mask associated with a source image. Referring to FIG. 8 in light of FIGS. 1-3 and 5-6C, FIG. 8 is a flow diagram showing a method 800 for employing a hybrid level set algorithm for interactively editing a matting region and a selection. Each block of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 810, a source image or a portion thereof, and a selection mask associated therewith, is provided for display. The selection mask comprises a selected region and an unselected region separated by a selection mask boundary. By way of example, an object in a source image is roughly selected by employing a hard selection tool (i.e., a quick selection tool) that utilizes a conventional level set algorithm. The selected and unselected regions are separated by a mask boundary, which can be, for example, a dotted line, a defined line distinguished by the varying shades or colors of the selected and unselected regions, and the like.

At block 820, a selection cursor is provided for display over at least a portion of the source image. The selection cursor has an interior region and a peripheral region. By way of example, the selection cursor 100 of FIG. 1 can be employed as a selection cursor in accordance with embodiments described herein.

At block 830, an adjustment is processed to the selection mask boundary in a portion of the source image that is overlaid by the peripheral region of the selection cursor. The adjustment includes applying a hybrid algorithm to the selection mask boundary along an initial position of the selection mask. The hybrid algorithm comprises a boundary-detecting feature configured to detect a boundary as a result of applying the boundary-detecting feature and a region-defining feature configured to define at least a matting region along the detected boundary.

Referring now to FIGS. 1-3 and 5-6C in light of FIGS. 3-8, FIG. 9 is a flow diagram showing a method 900 for employing a hybrid level set algorithm for interactively editing a matting region and a selection. Each block of method 900 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 910, a selection cursor having an interior region and a peripheral region is overlaid on a displayed source image. By way of example only, a selection cursor such as selection cursor 300 of FIG. 3 is provided as a selection tool over a source image for control by one or more user inputs (e.g., mouse movements and click-inputs). At block 920, a boundary within a region of the source image that is overlaid by the peripheral region of the selection cursor is detected by applying a boundary-detecting feature of a hybrid algorithm to a portion of the source image. At block 930, at least a matting region is defined along the detected boundary. The matting region is defined by applying a region-defining feature of the hybrid algorithm to the portion of the source image.

Figure 10:
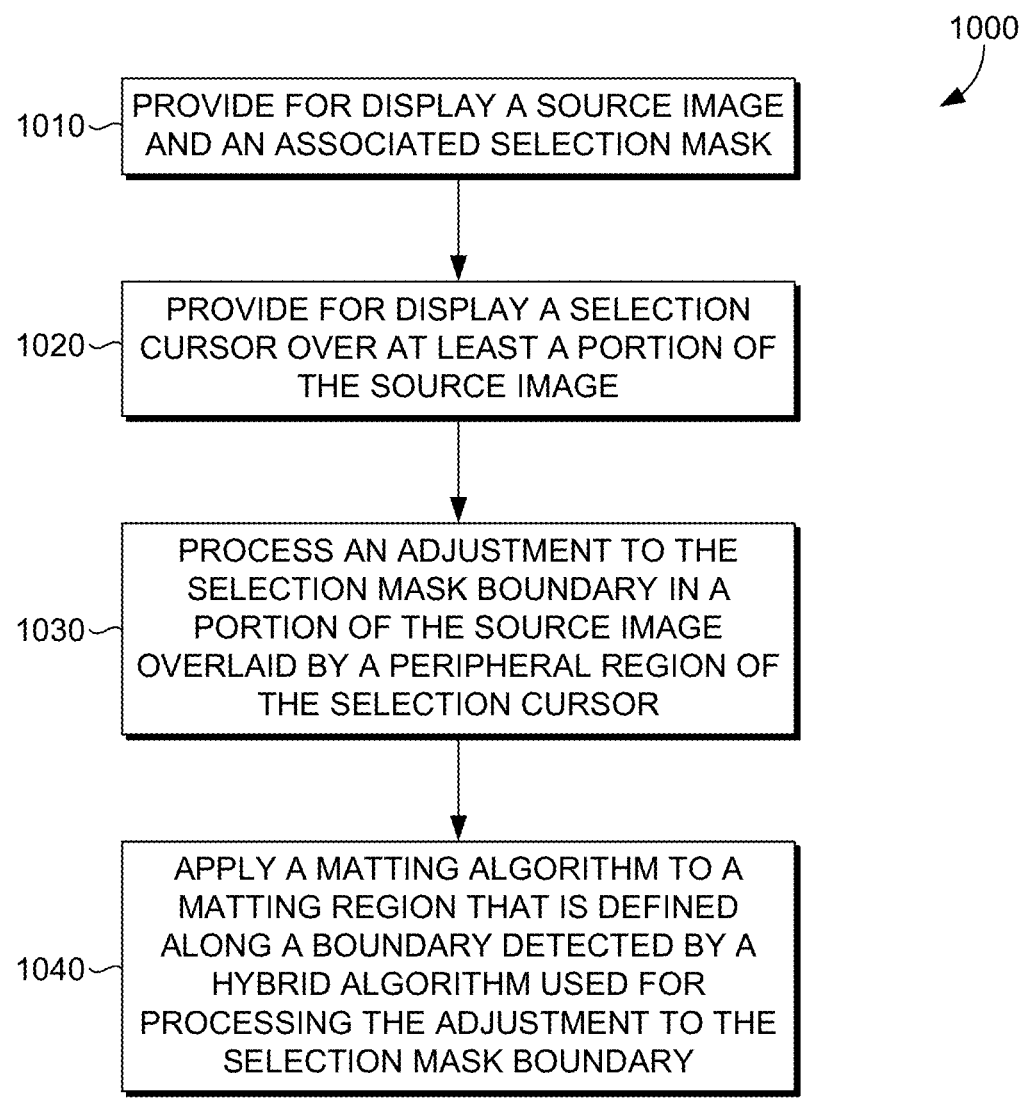
FIG. 10 is a flow diagram showing a method for adjusting a selection mask associated with a source image, in accordance with implementations of the present disclosure.

Referring to FIG. 10 in light of FIGS. 1-3 and 5-6C, FIG. 10 is a flow diagram showing a method 1000 for employing a hybrid level set algorithm for interactively editing a matting region and a selection. Each block of method 1000 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1010, at least a portion of the source image and a selection mask associated therewith is provided for display. The selection mask comprises a selected region and an unselected region separated by a selection mask boundary. At block 1020, a selection cursor is provided for display over at least a portion of the source image. The selection cursor can have an interior region and a peripheral region, similarly to that as was described in FIG. 1. At block 1030, an adjustment is processed to the selection mask boundary in a portion of the source image that is overlaid by the peripheral region of the selection cursor. The adjustment includes applying a hybrid algorithm to the selection mask boundary along an initial position of the selection mask. The hybrid algorithm comprises a boundary-detecting feature configured to detect a boundary as a result of applying the boundary-detecting feature and a region-defining feature configured to define at least a matting region along the detected boundary. At block 1040, a matting algorithm is applied to the matting region that is defined along the detected boundary.

Figure 11:
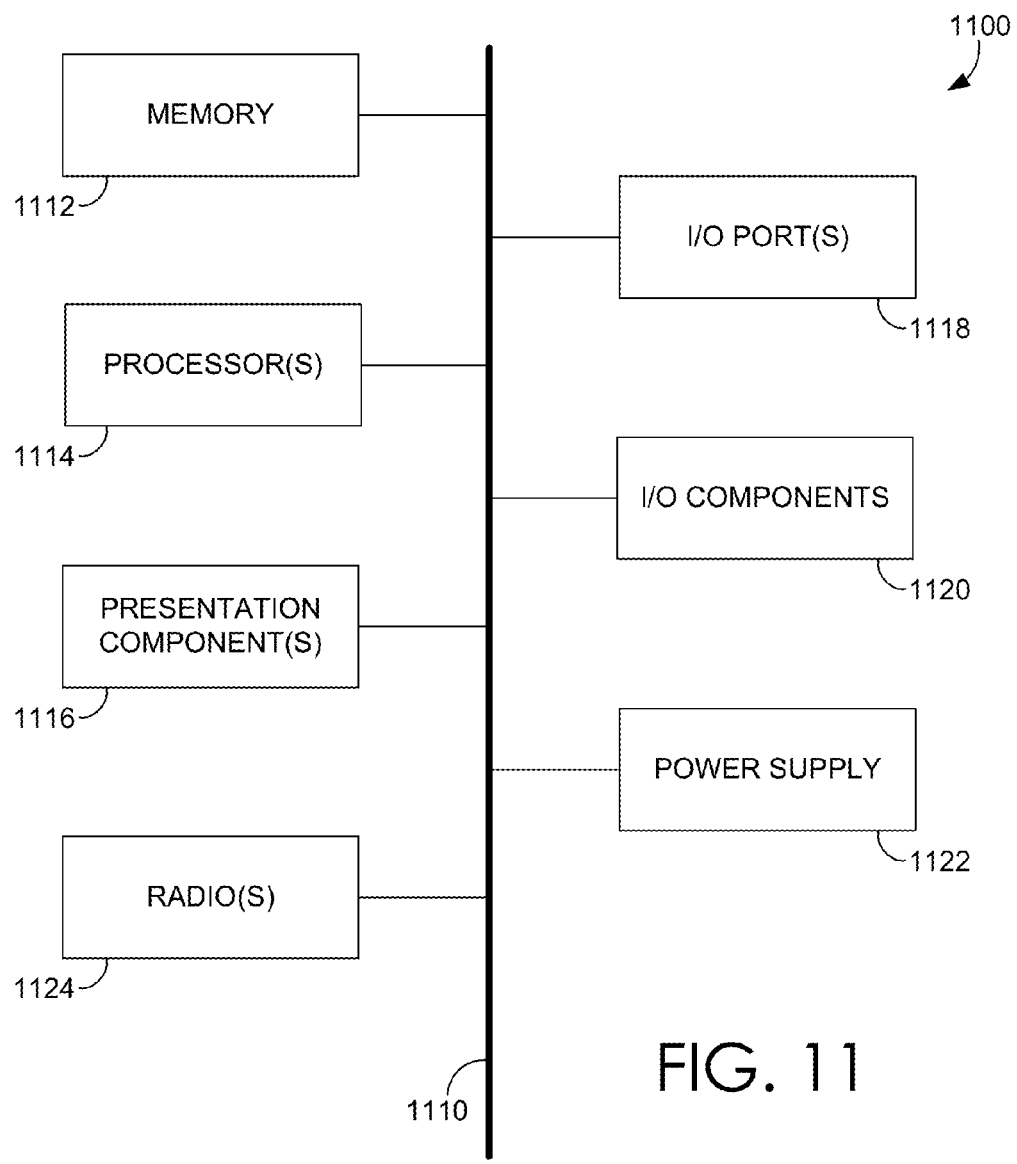
FIG. 11 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As described above, implementations of the present disclosure provide for adjusting a selection mask associated with a source image by employing a hybrid algorithm. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for adjusting selection masks, the method comprising:
providing for display a mask selection cursor as an overlay above a first area of a displayed image, wherein the displayed image presents at least one image subject;
determining that at least an overlaid portion of a first image subject of the at least one image subject presents an indefinite boundary line, wherein the overlaid portion of the first image subject is overlaid by at least a first portion of the mask selection cursor;
defining a matting region along the presented indefinite boundary line overlaid by at least the first portion of the mask selection cursor based at least in part on a determination that a first area of at least the portion of the first image subject on a first side of the presented indefinite boundary line, and a second area of at least the portion of the first image subject on a second side of the presented indefinite boundary line, each presents a corresponding distinctive region of at least the portion of the first image subject, wherein the defined matting region corresponds to a third area of at least the portion of the first image subject that is positioned between the first area and the second area; and
modifying a selection mask to include a soft selection that is generated based on the defined matting region, wherein the soft selection includes a refined selection that corresponds to the presented indefinite boundary line.

2. The computer-implemented method of claim 1, wherein the mask selection cursor includes at least an inner portion and an outer portion, and wherein the first portion of the mask selection cursor corresponds to the outer portion.

3. The computer-implemented method of claim 1, wherein the determination that at least the overlaid portion of the first image subject presents the indefinite boundary line is made in response to a received input.

4. The computer-implemented method of claim 3, further comprising:
providing for display a selected matting region that corresponds to the defined matting region.

5. The computer-implemented method of claim 4, wherein the defined matting region is configured to expand outwardly based on a duration of the received input.

6. A non-transitory computer storage medium storing computer-useable instructions that, when used by one or more computing devices, cause the one or more computing devices to perform operations comprising:
presenting a mask selection cursor as an overlay above a first area of a displayed image, wherein the displayed image presents at least one image subject;
in response to a received input, determining that at least an overlaid portion of a first image subject of the at least one image subject presents an indefinite boundary line, wherein the overlaid portion of the first image subject is overlaid by at least a first portion of the mask selection cursor;
defining a matting region along the presented indefinite boundary line overlaid by at least the first portion of the mask selection cursor based at least in part on a determination that a first area of at least the portion of the first image subject on a first side of the presented indefinite boundary line, and a second area of at least the portion of the first image subject on a second side of the presented indefinite boundary line, each presents a distinctive region of at least the portion of the first image subject, wherein the defined matting region corresponds to a third area of at least the portion of the first image subject that is positioned between the first area and the second area; and
modifying a selection mask to include a soft selection that is generated based on the defined matting region, wherein the soft selection includes a refined selection that corresponds to the presented indefinite boundary line.

7. The non-transitory computer storage medium of claim 6, wherein the selection mask is modified in response to a termination of the received input.

8. The non-transitory computer storage medium of claim 7, wherein the defined matting region is configured to expand outwardly based on a duration of the received input.

9. The non-transitory computer storage medium of claim 7, wherein the mask selection cursor includes at least an inner portion and an outer portion, and wherein the first portion of the mask selection cursor corresponds to the outer portion.

10. The non-transitory computer storage medium of claim 9, wherein the inner portion of the mask selection cursor is configured to modify, in response to the received input, the selection mask with an added portion of the displayed image overlaid by the inner portion of the mask selection cursor.

11. The non-transitory computer storage medium of claim 6, the operations further comprising:
providing for display the defined matting region for a duration of the received input.

12. A computerized system comprising:
at least one processor;
a user interface module configured to present a mask selection cursor as an overlay above a first area of a displayed image, wherein the displayed image presents at least one image subject; and
a hybrid selection refining module configured to:
determine, in response to a received input, that at least an overlaid portion of a first image subject of the at least one image subject presents an indefinite boundary line, wherein the overlaid portion of the first image subject is overlaid by at least a first portion of the mask selection cursor;
define a matting region along the presented indefinite boundary line overlaid by at least the first portion of the mask selection cursor based at least in part on a determination that a first area of at least the portion of the first image subject on a first side of the presented indefinite boundary line, and a second area of at least the portion of the first image subject on a second side of the presented indefinite boundary line, each presents a distinctive region of at least the portion of the first image subject, wherein the defined matting region corresponds to a third area of at least the portion of the first image subject that is positioned between the first area and the second area; and modify, in response to a termination of the received input, a selection mask to include a soft selection that is generated based on the defined matting region, wherein the soft selection includes a refined selection that corresponds to the presented indefinite boundary line.

13. The computerized system of claim 12, wherein at least a portion of the defined matting region is configured to expand outwardly based on a duration of the received input.

14. The computerized system of claim 13, wherein at least a portion of the defined matting region is configured to expand outwardly until being constrained by a detected clearly defined edge of the first image subject.

15. The computerized system of claim 13, wherein the defined matting region is provided for display as a selected matting region throughout the duration of the received input.

16. The computerized system of claim 12, wherein the mask selection cursor includes at least an inner portion and an outer portion, and wherein the first portion of the mask selection cursor corresponds to the outer portion.

17. The computerized system of claim 16, wherein the inner portion of the mask selection cursor is configured to modify, in response to the received input, the selection mask with an added portion of the displayed image overlaid by the inner portion of the mask selection cursor.

* * * * *